United States Patent [19]

Blomgren et al.

[11] Patent Number: 4,808,497

[45] Date of Patent: Feb. 28, 1989

[54] ORGANIC ELECTROLYTE FOR NONAQUEOUS CELLS

[75] Inventors: George E. Blomgren, Lakewood; Violeta Z. Leger, North Olmsted, both of Ohio

[73] Assignee: Eveready Battery Company, St. Louis, Mo.

[21] Appl. No.: 566,305

[22] Filed: Dec. 28, 1983

[51] Int. Cl.$^4$ .............................................. H01M 6/14
[52] U.S. Cl. .................................. 429/194; 429/197; 429/199
[58] Field of Search ............... 429/194, 199, 219, 220, 429/224, 228, 197; 252/62.2

[56] References Cited

U.S. PATENT DOCUMENTS

| | | | |
|---|---|---|---|
| 3,778,310 | 12/1973 | Garth | 429/194 |
| 4,118,550 | 10/1978 | Koch | 429/194 |
| 4,163,829 | 8/1979 | Kroenberg | 429/194 |
| 4,367,266 | 1/1983 | Kalnoki-Kis | 429/194 X |
| 4,419,422 | 12/1983 | Leger et al. | 429/194 |

OTHER PUBLICATIONS

J. Amer. Chem. Soc., 1968, 90, 4654, Chan et al.
Shimizu et al., "Synthesis of Aromatic Aldehyde by Liquid Phase Oxidation with Molecular Oxygen", *Journal of Japan Petroleum Industry*, vol. 25, No. 1, pp. 7-15, 1982.
Article by J. P. Gabano, Academic Press, 1983, p. 381, titled "Lithium Batteries".

*Primary Examiner*—Brian E. Hearn
*Assistant Examiner*—Stephen J. Kalafut
*Attorney, Agent, or Firm*—Robert W. Welsh

[57] ABSTRACT

An electrolyte for nonaqueous cells containing a solvent comprising at least one diether containing the sequence $O_1C_1C_2O_2$ wherein two or three contiguous atoms are part of a five-, six- or seven-member ring system having as the remaining ring atoms carbon, or carbon and hetero atoms, with a methyl group bonded to an oxygen atom $O_1$ and/or $O_2$ when said oxygen atom is not included in the ring structure.

13 Claims, No Drawings

ORGANIC ELECTROLYTE FOR NONAQUEOUS CELLS

DESCRIPTION

1. Technical Field

The invention relates to an organic electrolyte solution for use in nonaqueous cells such as Li/polycarbon fluoride, Li/MnO$_2$ and the like, and wherein said electrolyte solution comprises a solute dissolved in a solvent comprising at least one diether in which two oxygen atoms are separated by two carbon atoms in the sequence O$_1$C$_1$C$_2$O$_2$ and in which two or three contiguous atoms of the sequence are contained in a ring system of five, six or seven members in which the remaining ring atoms are carbon or carbon and hetero atoms with the proviso that when the oxygen atom O$_1$ and/or O$_2$ is not included in the ring structure, a methyl group is bonded to said oxygen atom.

2. Background of the Art

The development of high energy battery systems requires the compatibility of an electrolyte possessing desirable electrochemical properties with highly reactive anode materials, such as lithium, sodium, and the like and the efficient use of high energy density cathode materials, such as manganese dioxide, polycarbon fluorides such as (C$_2$F)$_n$, (CF$_x$)$_n$ in which x is greater than 0 up to about 1.2, and the like. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

A multitude of solutes is known and suggested for use, but the selection of a suitable solvent has been particularly troublesome since many of those solvents which are used to prepare electrolytes sufficiently conductive to permit effective ion migration through the solution are reactive with the highly active anodes mentioned above. Most investigators in this area, in search of suitable solvents, have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with high energy density cathode materials, such as polycarbon fluoride and the like, and were sufficiently corrosive to lithium anodes to prevent efficient performance over any length of time.

Although specific solutes and solvents have been mentioned as good electrolyte solutions for certain cell systems, it is not always possible to predict whether combinations of these components would effectively and efficiently function in other cell systems. Thus while the theoretical energy, i.e., the electrical energy potentially available from a selected anode-cathode couple, is relatively easy to calculate, there is a need to choose a nonaqueous electrolyte for a couple that permits the actual energy produced by an assembled battery to approach the theoretical energy. The problem usually encountered is that it is practically impossible to predict in advance how well, if at all, a conductive nonaqueous electrolyte will function with a selected couple with regard to stability and corrosion behavior.

Thus a cell must be considered as a unit having three parts: a cathode, an anode, and an electrolyte, and it is to be understood that the parts of one cell are not predictably interchangeable with parts of another cell to produce an efficient and workable cell.

It is an object of the present invention to provide a novel solvent for an electrolyte solution for use in nonaqueous cell systems.

It is another object of the present invention to provide an electrolyte solution for nonaqueous cell systems in which the solvent is a cyclic diether containing the sequence O$_1$C$_1$C$_2$O$_2$ wherein two or three contiguous atoms are part of a five-, six- or seven-member ring system having as the remaining ring atoms either carbon, or carbon and hetero atoms.

It is another object of the present invention to provide a Li/polycarbon fluoride nonaqueous cell with an electrolyte solution comprising a solvent of a cyclic diether containing the sequence O$_1$C$_1$C$_2$O$_2$ wherein two or three contiguous atoms are part of a five-, six- or seven-member ring system having as the remaining ring atoms carbon, or carbon and hetero atoms.

The foregoing and additional objects will become more fully apparent from the following description.

SUMMARY OF THE INVENTION

The invention is directed to a nonaqueous electrolyte solution for nonaqueous cells comprising a solute dissolved in a solvent, said solvent comprising at least one diether in which two oxygen atoms are separated by two carbon atoms in the sequence O$_1$C$_1$C$_2$O$_2$ and in which two or three contiguous atoms of the sequence are contained in a ring system of five, six or seven members in which the remaining ring atoms are carbon, or carbon and hetero atoms, with the proviso that when the oxygen atom O$_1$ or O$_2$, or oxygen atoms O$_1$ and O$_2$, are not included in the ring structure, a methyl group is bonded to said oxygen atom or atoms. The hetero atoms could be selected from the group comprising oxygen, nitrogen, phosphorus and sulfur.

Suitable diethers for use in this invention are as follows:

1. 2-methoxymethyltetrahydrofuran which also is known as methyltetrahydrofurfuryl ether and has a boiling point of 140° C. and a formula as follows:

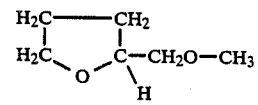

2. o-dimethoxybenzene which also is known as veratrole or the dimethyl ether of catechol and has a melting point of 22.5° C., a boiling point of 206° C. and a formula as follows:

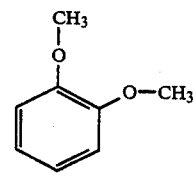

3. 3,4-dimethoxytoluene which has a melting point of 24° C., a boiling point of 219° C. and a formula as follows:

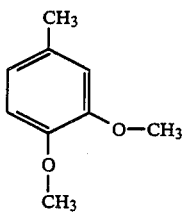

4. 2,3-dimethoxytoluene which has a boiling point of 203° C. and a formula as follows:

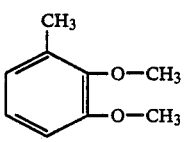

5. 2-methoxy-1,4-dioxane which has a boiling point of 49° C. at 21 mm and a formula as follows:

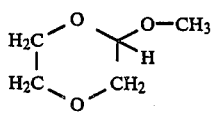

Of the above, 2-methoxymethyltetrahydrofuran would be preferred. In an article appearing in J. Amer. Chem. Soc. 1968, 90, 4654, the authors I. L. Chan and J. Smid have shown that this material, when used as a solvent, has the property of separating contact ion pairs. Because contact ion pairs are strongly held pairs of cation and anion which have a strong tendency to form in nonaqueous solvents of low to moderate dielectric constant, such ion pairs do not contribute to the flow of electricity in such a solution. It is believed that the separation of solute ion pairs in 2-methoxymethyltetrahydrofuran thereby provides conductivity to the solution. It is also believed that since 2-methoxymethyltetrahydrofuran has two oxygen atoms separated by two carbon atoms, its geometrical arrangement is especially favorable for strong coordination by both oxygens to lithium ions, thereby facilitating ion pair separation with lithium salts.

Another preferred solvent is o-dimethoxybenzene which also has a tendency to dissociate contact ion pairs. The ring system of this solvent serves the purpose of making rigid the geometry of the four atom chain O—C—C—O so that a bidentate coordination to lithium ions is favored.

The cyclic diethers of the invention could comprise the sole solvent of the electrolyte solution or could be used in conjunction with one or more cosolvents. Suitable cosolvents could be taken from the group comprising sulfolane; 3-methyl sulfolane; tetrahydrofuran; 2-methyltetrahydrofuran; 1,3-dioxolane; 3-methyl-2-oxazolidone; propylene carbonate; γ (gamma)-butyrolactone; γ (gamma)-valerolactone; ethylene glycol sulfite; dimethylsulfite; dimethyl sulfoxide; and 1,1- and 1,2-dimethoxyethane. Of these cosolvents, the best are sulfolane; 3-methyl sulfolane; 3-methyl-2-oxazolidone; propylene carbonate; γ (gamma) butyrolactone; 1,2-dimethoxyethane, and 1,3-dioxolane because they appear more chemically inert to battery components and have wide liquid ranges, and especially because they permit highly efficient utilization of the cathode materials.

If a coordinating diether is used as a cosolvent in conjunction with a lithium containing solute, it preferably should be present in an amount to provide at least one molecule of the diether for every lithium ion from the solute. Thus, if the lithium solute is to form a 1 molar solution, the diether should also be present in at least a 1 molar amount. The other solvent(s) of the solution may be any dipolar, aprotic solvent which is compatible with the anode, such as lithium, and the cathode, such as poly-carbon fluoride.

In some applications, possibly rechargeable cells, a low viscosity cosolvent may be used in the electrolyte solution. Suitable low viscosity cosolvents would include tetrahydrofuran (THF), 2-methyltetrahydrofuran (2-MeTHF), 1,3-dioxolane (DIOX), 1,2-dimethoxyethane (DME), 1,4-dioxane, or the like.

The ionizing solute for use in the invention may be a simple or double salt or mixtures thereof, for example, $LiCF_3SO_3$, $LiBF_4$, $LiPF_6$, $LiAsF_6$ and $LiClO_4$, which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is of sufficient ionic conductivity. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December, 1938, pages 293–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, boron bromide, phosphorous pentafluoride, arsenic pentafluoride and antimony pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

Cathodes suitable for use with the electrolyte solution of this invention would include manganese dioxide, polycarbon fluoride, iron sulfides, $CrO_x$ where $x=2$ to 3, $Bi_2O_3$, $Ag_2CrO_4$, $Pb_3O_4$, $CuS$, $CuO$, $TiS_2$ and mixtures thereof.

The water inherently contained in both electrolytic and chemical types of manganese dioxide can be substantially removed by various treatments. For example, the manganese dioxide can be heated in air or an inert atmosphere at a temperature up to 380° C. for about 8 hours or at a lower temperature for a longer period of time. Care should be taken to avoid heating the manganese dioxide above its decomposition temperature which is about 400° C. in air. In oxygen atmospheres, higher temperatures may be employed. In accordance with this invention the manganese dioxide should be heated for a sufficient period of time to insure that the water content is reduced preferably below about 1 weight percent, more preferably below about 0.5 and most preferably below about 0.2 weight percent based on the weight of the manganese dioxide. An excessive amount of water would react with the highly active metal anode, such as lithium, and cause it to corrode thereby resulting in hydrogen evolution. After the water removal treatment has been completed, the manganese dioxide should be shielded to prevent adsorption of water from the atmosphere. This could be accomplished by handling the treated manganese dioxide in a dry box or the like. Alternatively, the treated manganese dioxide or the manganese dioxide combined with a conductive agent and a suitable binder could be heat treated to remove water that could have been adsorbed from the atmosphere.

Preferably, the manganese dioxide to be used with the electrolyte of this invention would be heat treated to remove its water content preferably below about 1 weight percent and then it would be mixed with a conductive agent such as graphite, carbon or the like and a binder such as Teflon (trademark for polytetrafluoroethylene) or styrene-butadiene copolymer to produce a solid cathode electrode. If desired, a small amount of the electrolyte can be incorporated into the manganese dioxide cathode mix.

The polycarbon fluoride cathodes for use with the electrolyte of this invention can be composed of carbon and fluorine in which the carbon includes graphitic and non-graphitic forms of carbon, such as coke, charcoal or activated carbon and have the formula $(C_yF_x)_n$ wherein y is 1 or 2, x is greater than 0 up to about 1.2 and n refers to the number of monomer units which can vary widely. Preferably, the polycarbon fluoride would be those having a y of 1 and an x between about 0.8 and 1.0, and poly-dicarbon monofluoride $(C_2F)_n$.

Fluorinated carbon cathodes are disclosed in U.S. Pat. Nos. 3,636,352, 3,700,502 and 4,271,242 as having the formula $(CF_x)_n$ where x varies from 0.5 to about 1.0. U.S. Pat. No. 4,139,474 discloses $(C_2F)_n$ material suitable for use as cathodes. The disclosure of these U.S. Patents are incorporated by reference as if set out in full text.

Highly active anodes for use in nonaqueous systems employing the novel electrolyte according to this invention would be consumable metals and include aluminum, the alkali metals, alkaline earth metals and alloys of alkali metals or alkaline earth metals with each other and other metals. The term "alloys" as used herein and in the appended claims is intended to include mixtures, solid solutions, such as lithium-magnesium, and the intermetallic compounds, such as lithium monoaluminide. The preferred anode materials are lithium, sodium, potassium, calcium, magnesium and alloys thereof. Of the preferred anode materials, lithium would be the best because, in addition to being a ductile metal that can be easily assembled in a cell, it possesses the highest energy-to-weight ratio of the group of suitable anodes.

EXAMPLE 1

Several miniature cylindrical cells (nominally 0.063 inch high and 0.787 inch in diameter) were constructed employing a cathode of 0.18 gram mix containing 80% by weight $CF_x$ with $x \sim 0.99$, 10% by weight carbon black as conductor, and 10% by weight polytetrafluoroethylene binder, a lithium anode (0.0238 gram); a nonwoven glass fiber separator; and an electrolyte solution of 1M $LiBF_4$ in a 50:50 volume ratio of propylene carbonate (PC) and methyl tetrahydrofurfuryl ether (MeTHFE).

Similar cells were constructed using dimethoxyethane (DME) or 2-methyltetrahydrofuran (2-MeTHF) in place of MeTHFE. The 2-MeTHF structure is a cyclic monoether having the following formula:

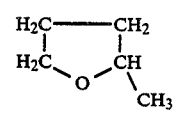

Two fresh cells of each type were continuously discharged across a 15-kilohm load (background load) with a superimposed 400-ohm pulse load (pulse load) (once per day, 3 days a week, for 2 seconds) at 21° C. The average milliampere hour service was calculated to a 2.0 volt cutoff for two cells of each type and the data are shown in Table 1.

TABLE 1

| Cells (Solvent) | Background Load mAh | Pulse Load mAh |
|---|---|---|
| DME + PC | 83 | 78 |
| 2-MeTHF + PC | 80 | 62 |
| MeTHFE + PC | 81 | 72 |

EXAMPLE 2

Several cells were produced as in Example 1 using either DME, 2-MeTHE or MeTHFE in conjunction with PC. Three cells of each type were continuously discharged across a 30-kilohm background load with a superimposed 400-ohm pulse load as described in Example 1. Three additional cells of each type were either stored for 20 days at 60° C., 40 days at 60° C., 60 days at 60° C., or 30 days at 71° C. and then discharged at 21° C. as discussed above. The average milliampere hour output to a 2.0 volt cutoff for both the background load and pulse load were calculated. The data so calculated are shown in Table 2.

TABLE 2

| Cells (Solvent PC +) | Condition | Background Load mAh | Pulse Load mAh |
|---|---|---|---|
| DME | Fresh | 80 | 69 |
| 2-MeTHF | Fresh | 81 | 69 |
| MeTHFE | Fresh | 85 | 75 |
| DME | 20 days at 60° C. | 82 | 68 |
| 2-MeTHF | 20 days at 60° C. | 83 | 57 |
| MeTHFE | 20 days at 60° C. | 83 | 71 |
| DME | 40 days at 60° C. | 82 | 71 |
| 2-MeTHF | 40 days at 60° C. | 82 | 59 |
| MeTHFE | 40 days at 60° C. | 82 | 74 |
| DME | 60 days at 60° C. | 79 | 71 |
| 2-MeTHF | 60 days at 60° C. | 80 | 57 |
| MeTHFE | 60 days at 60° C. | 84 | 75 |
| DME | 30 days at 71° C. | 82 | 70 |

TABLE 2-continued

| Cells (Solvent PC +) | Condition | Background Load mAh | Pulse Load mAh |
|---|---|---|---|
| 2-MeTHF | 30 days at 71° C. | 81 | 51 |
| MeTHFE | 30 days at 71° C. | 81 | 67 |

The data show that the cells employing MeTHFE as a solvent had good discharge characteristics and excellent pulse performance after being stored under extreme conditions of 60 days at 60° C. and 30 days at 71° C.

We claim:

1. A nonaqueous electrolyte solution for nonaqueous cells comprising a solute dissolved in a solvent, said solvent comprising at least one diether in which two oxygen atoms are separated by two carbon atoms in the sequence $O_1C_1C_2O_2$ and in which two or three contiguous atoms of the sequence are contained in a ring system of five, six or seven members in which the remaining ring atoms are carbon, or carbon and hetero atoms, with the proviso that when the oxygen atom $O_1$ or $O_2$, or oxygen atoms $O_1$ and $O_2$, are not included in the ring structure, a methyl group is bonded to said oxygen atom or atoms;

said electrolyte solution containing at least one cosolvent selected from the group consisting of sulfolane; 3-methyl sulfolane; tetrahydrofuran; 2-methyltetrahydrofuran; 1,3-dioxolane; 3-methyl-2-oxazolidone; propylene carbonate; $\gamma$ (gamma)-butyrolactone; $\gamma$ (gamma)-valerolactone; ethylene glycol sulfite; dimethylsulfite; dimethyl sulfoxide; and 1,1- and 1,2-dimethoxyethane.

2. A nonaqueous electrolyte solution for nonaqueous cells comprising a solute dissolved in a solvent, said solvent comprising at least one diether in which two oxygen atoms are separated by two carbon atoms in the sequence $O_1C_1C_2O_2$ and in which two or three contiguous atoms of the sequence are contained in a ring system of five, six or seven members in which the remaining ring atoms are carbon, or carbon and hetero atoms, with the proviso that when the oxygen atom $O_1$ or $O_2$, or oxygen atoms $O_1$ and $O_2$, are not included in the ring structure, a methyl group is bonded to said oxygen atom or atoms;

said solute being selected from the group consisting of $LiCF_3SO_3$, $LiBF_4$, $LiClO_4$, $LiPF_6$ and $LiAsF_6$.

3. A nonaqueous cell comprising an active metal anode, a cathode and an electrolyte solution comprising a solute dissolved in a solvent, said solvent comprising at least one diether in which two oxygen atoms are separated by two carbon atoms in the sequence $O_1C_1C_2O_2$ and in which two or three contiguous atoms of the sequence are contained in a ring system of five, six or seven members in which the remaining ring atoms are carbon, or carbon and hetero atoms, with the proviso that when the oxygen atom $O_1$ or $O_2$, or oxygen atoms $O_1$ and $O_2$, are not included in the ring structure, a methyl group is bonded to said oxygen atom.

4. The nonaqueous cell of claim 3 wherein said hetero atoms are selected from the group consisting of oxygen, nitrogen, phosphorus and sulfur.

5. The nonaqueous cell of claim 3 wherein said diether is methyltetrahydrofurfuryl ether.

6. The nonaqueous cell of claim 3 wherein said diether is o-dimethoxybenzene.

7. The nonaqueous cell of claim 3 wherein said diether is 3,4-dimethoxytoluene.

8. The nonaqueous cell of claim 3 wherein said diether is 2,3-dimethoxytoluene.

9. The nonaqueous cell of claim 3 wherein said diether is 2-methoxy-1,4-dioxane.

10. The nonaqueous cell of claim 3 wherein the electrolyte solution contains at least one cosolvent selected from the group consisting of sulfolane; 3-methylsulfolane; tetrahydrofuran; 2-methyltetrahydrofuran; 1,3-dioxolane; 3-methyl-2-oxazolidone; propylene carbonate; $\gamma$ (gamma)-butyrolactone; $\gamma$ (gamma)-valerolactone; ethylene glycol sulfite; dimethylsulfite; dimethyl sulfoxide; and 1,1- and 1,2-dimethoxyethane.

11. The nonaqueous cell of claim 3 wherein the electrolyte solution contains at least one low viscosity cosolvent selected from the group consisting of tetrahydrofuran, 2-methyltetrahydrofuran, 1,3-dioxolane, 1,2-dimethoxyethane and 1,4-dioxane.

12. The nonaqueous cell of claim 3 wherein said cathode is selected from the group consisting of $MnO_2$, $(C_yF_x)_n$ wherein y is 1 or 2 and x is greater than 0 up to about 1.2, $CrO_x$ wherein $x=2$ to 3, iron sulfides, $Bi_2O_3$, $Ag_2CrO_4$, $Pb_3O_4$, $CuS$, $CuO$, $TiS_2$ and mixtures thereof.

13. The nonaqueous cell of claim 3 where said metal anode is selected from the group consisting of lithium, potassium, sodium, calcium, magnesium, aluminum and alloys thereof.

* * * * *